United States Patent [19]
Dien

[11] Patent Number: 5,751,564
[45] Date of Patent: May 12, 1998

[54] DUAL/MULTIPLE VOLTAGE LEVEL INPUT SWITCHING POWER SUPPLY

[76] Inventor: Ghing-Hsin Dien, 10F-A, No. 148, Sec. 2, Fu Hsing S. Rd., Taipei, Taiwan

[21] Appl. No.: 292,815

[22] Filed: Aug. 10, 1994

[51] Int. Cl.[6] .................. H02M 5/45; H02J 7/00
[52] U.S. Cl. .............................. 363/37; 307/64
[58] Field of Search ............. 363/34, 37; 307/22, 307/26, 28, 29, 64, 66, 75

[56] References Cited

U.S. PATENT DOCUMENTS

| | | | |
|---|---|---|---|
| 4,728,808 | 3/1988 | Bet-Esh et al. | 307/66 |
| 4,780,801 | 10/1988 | Gill et al. | 363/25 |
| 5,010,469 | 4/1991 | Bobry | 363/37 |
| 5,229,650 | 7/1993 | Kita et al. | 307/66 |
| 5,384,792 | 1/1995 | Hirachi | 307/64 |

OTHER PUBLICATIONS

Stan Gibilisco and Neil Sclater, *Encyclopedia of Electronics 2nd Edition* (McGraw Hill, Inc., 2nd Edition 1990) pp. 659–662.

*Primary Examiner*—Matthew V. Nguyen
*Attorney, Agent, or Firm*—Michael J. Kline; Carol I. Bordas; Noland J. Cheung

[57] ABSTRACT

A switching power supply system which is able to connect two or more different power sources with different voltage levels, and can provide uninterrupted power even when the primary power source is low or absent. The output voltage is much more steady than that in a conventional switching power supply and the efficiency loss is smaller as well. As a result, the backup supply time is longer than a conventional UPS system. Finally, when used in, for example, a notebook computer, there is no need to use an AC to DC adaptor when connecting to commercial AC power since the switching power supply can be directly connected to the commercial AC power for operation.

4 Claims, 3 Drawing Sheets

5,751,564

DUAL/MULTIPLE VOLTAGE LEVEL INPUT SWITCHING POWER SUPPLY

FIELD OF THE INVENTION

The present invention relates to a switching power supply system and, in particular, to a switching power supply system which is able to connect to two or more power sources with different voltage levels. More specifically, the invention relates to a switching power supply system which has at least one higher voltage power source input and another lower voltage power source input, wherein the second power source can backup the first one when a power failure occurs in the first power source.

BACKGROUND OF THE INVENTION

It is known in the prior art to construct switching regulated power supplies. It is also known in the prior art to construct an Uninterruptable Power Supply ("U.P.S.").

In a conventional switching power supply system, as shown in FIG. 6, there is only one input to connect to an external power source. In modern computer systems, a second, battery-powered supply is often used as a backup power supply when the primary power source (usually the AC110 V/60 Hz commercial power) is not available. For instance, to obtain an uninterrupted power supply for a computer system, a UPS (Uninterrupted Power Supply) system is needed and inserted at the input of the switching power supply. A block diagram of a conventional uninterrupted switching power supply system equipped with a UPS is shown in FIG. 1.

In the embodiment shown in FIG. 1, when the AC power source is lost, the UPS will start to convert the backup battery's DC supply into AC power to supply the switching power circuits, thus, an uninterrupted power supply is obtained.

From the above description, it can be seen that the conventional switching power supply system is designed to connect to only one kind of power source. If the switching power supply is designed to connect to the commercial AC 110 V/60 Hz power source, the external UPS system must use a DC to AC conversion circuit to convert the battery backup power into AC 110 V/60 Hz power before supplying the battery backup power to the switching power supply. This DC to AC conversion requires a complicated circuit, and causes noise and results in efficiency loss (power loss) as well as in a high production cost. In addition, the efficiency loss will shorten the supply time of the backup battery.

Furthermore, in modern notebook computers the power supply system usually includes an external AC to DC adaptor, an internal rechargeable battery and an internal switching power supply. When commercial AC power is available, the AC to DC adaptor is used to convert the AC power into a lower DC voltage source for the internal switching power supply of the computer. When the external AC power is unavailable, the internal battery is used as the power source. The internal switching power supply is designed to convert the low level voltage of the battery (usually 12 VDC to 24 VDC) into the desired outputs. When using the commercial AC power (usually 110 V/60 Hz) as the power source, the AC to DC adaptor is needed to convert the AC power into the same voltage level of the battery before being supplied to the internal switching power supply. The AC to DC adaptor adds an extra production cost and the weight of the adaptor lowers the portability of the notebook computer.

SUMMARY OF THE INVENTION

The present invention provides an improved switching power supply system wherein a second input is provided to connect to a power source with a different voltage level, and wherein the output voltage of the improved switching power supply will not be interrupted when the primary power source is lost.

According to the invention, the primary power source is connected to a first input of the switching power system, and the switching circuits to convert the primary power into the desired output voltages are the same as conventional switching power supplies. The secondary power source, which is designed to accept a voltage level different from that of the primary power source, is connected to a second input of the improved switching power system.

The output of the switching power system may be interrupted by any one of several events. These events include when the primary power source is lost, when the primary power source is unable to provide enough power for the load, when the primary power source is not providing consistent power levels, and when ripples are present in any of the output voltages.

When an interruption occurs, the monitoring circuit will automatically turn on the supply from the second power source and start to convert the secondary power source into desired output voltages. As a result, the output voltages will not be interrupted when the primary power source is low, absent, or inconsistent. When the primary power source is recovered, the monitoring circuit will turn off the conversion from the second power source and start to use the recovered primary power supply as the power source again.

The secondary power source is preferably used to supplement the primary source, although the primary source may be turned off and the switching power system may use only the secondary source.

In a preferred embodiment, the primary power source may be used to recharge the secondary power source if the secondary power source has been drained.

It is an objective of the invention to eliminate the DC to AC conversion circuits in the conventional switching power supply systems equipped with a UPS. According to the invention, the backup battery can be directly connected to the switching power circuits and converted into the desired output voltages. A DC to AC conversion circuit, as required in a conventional UPS system, is no longer needed and the production cost of the present invention is much lower than that of a conventional UPS system.

Another objective of the invention is to feed the backup power source directly into the improved switching power circuits and to convert the power directly into the desired outputs. The efficiency loss of the conventional UPS system, which occurs while converting DC power into AC power, is eliminated. As a result, the backup power's supply time will be longer than that of a conventional UPS system.

Yet another objective of the invention is to supply more steady output voltages and to reduce the backup response time. This objective is accomplished because the second backup power source will begin to supplement the primary power supply as soon as an interruption is detected, such as when the primary power source is low or having a ripple or when the transient load current exceeds the supply ability of the primary power source. The backup response time is much shorter than that of a conventional UPS system because the backup source is directly connected to the switching power supply circuits and the DC to AC conversion circuits have been eliminated.

An additional objective of the invention is to eliminate the AC to DC adaptor, as used in a notebook computer. According to the switching power supply of the invention, both the rectified high voltage from the AC power and the low voltage from the rechargeable battery can be directly connected to the improved switching power supply. The AC to DC adaptor is replaced by a simple internal rectifier and filter circuit. As a result, the production cost is decreased and the notebook computer's total weight is reduced, resulting in the portability of the notebook PC being greatly improved.

DETAILED DESCRIPTION OF THE PREFERRED EMBODIMENTS

Figure 1:
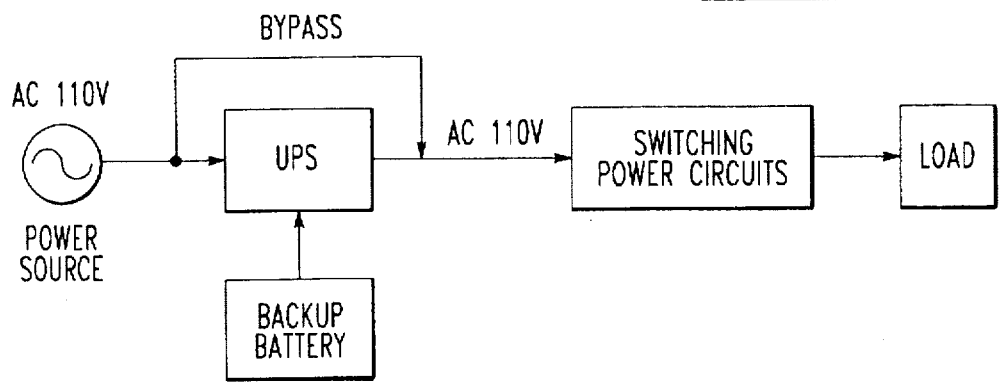
FIG. 1 shows a block diagram of a conventional switching power supply system equipped with a U.P.S.
Figure 2:
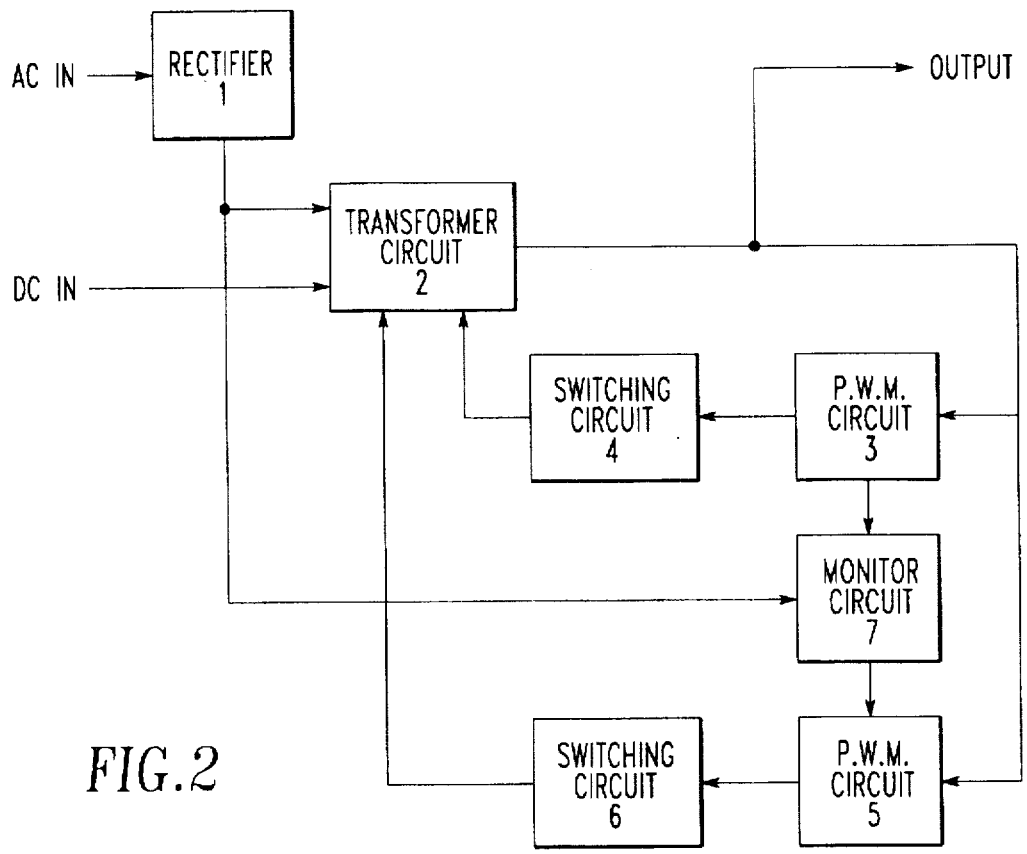
FIG. 2 shows a block diagram of the switching power supply system according to the invention.
Figure 4:
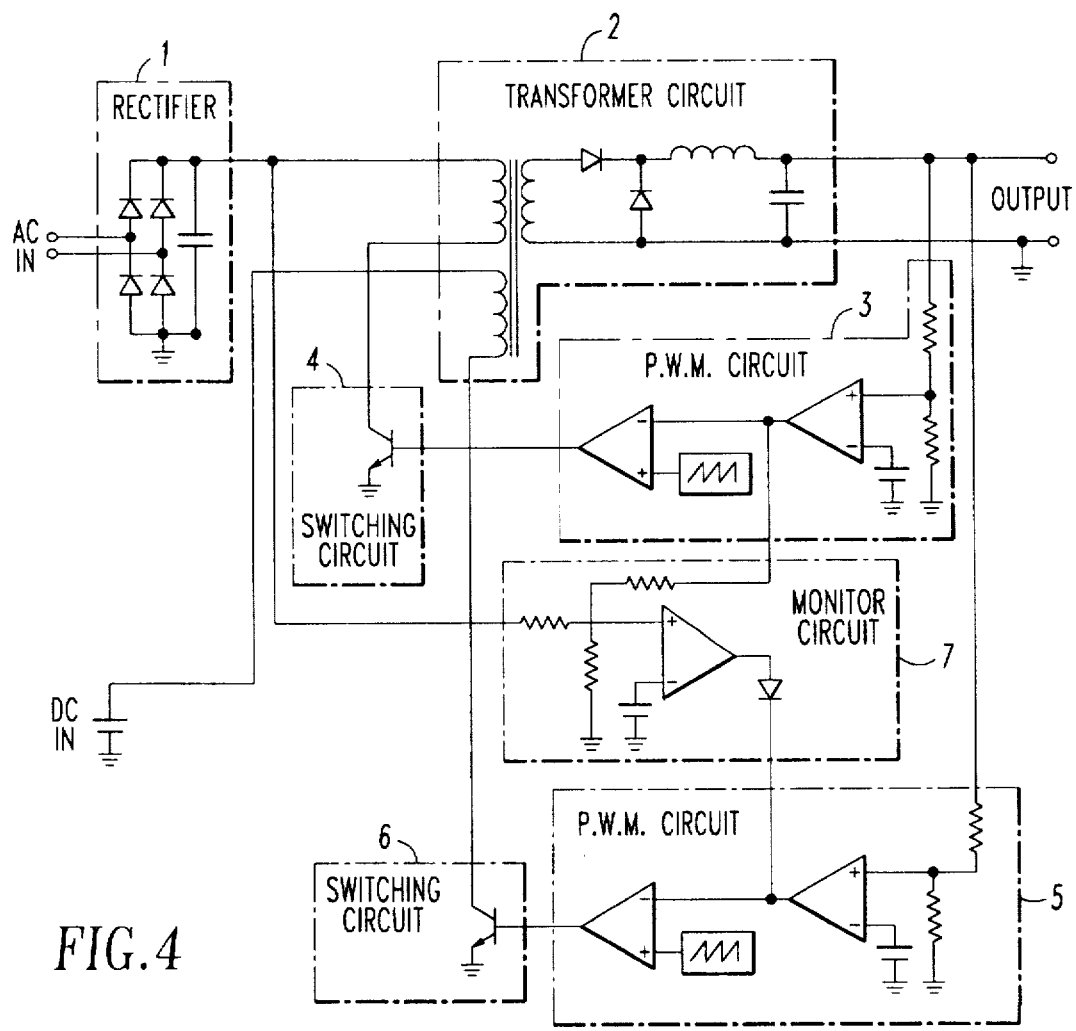
FIG. 4 shows a sample circuit of the improved switching power supply according to the block diagram of FIG. 2.

As shown in FIGS. 2 and 4, the switching power supply system of the invention comprises:

A rectifier circuit 1 to rectify the AC power source into a DC voltage, with the rectified DC power being is connected to a transformer circuit 2 and a monitor circuit 7.

The transformer circuit 2 has two input circuits, also known as primary circuits or primary windings, one for each of the two different power sources. It is, of course, possible to have more than two input circuits for multiple primary and multiple secondary power sources. The first input circuit is for the primary power source, which is the same as with a conventional switching power supply. The second input circuit is for the secondary power source.

The first input circuit is connected to the output of the rectifier 1 and is designed for the voltage of the primary power source.

The second input circuit is designed to connect to the secondary power source, which is a lower voltage source than the primary power source. This second input circuit is designed according to the lower voltage of the secondary power source to generate the required current flow and magnetic flux which is converted into the output current of the transformer circuit 2. Both the first input circuit and the second input circuit are placed in the same transformer circuit 2. In this way, a single transformer, without the aid of a DC to AC converter, can be used with both the primary and secondary power sources. When the first input circuit of the primary power source cannot generate sufficient current and magnetic flux for conversion, the power from the second input circuit will be brought on line to supply the current flow and generates magnetic flux to fill the insufficient part of the first input circuit.

The currents through the transformer circuit 2 from the primary and secondary power sources are controlled by a first switching circuit 4 and second switching circuit 6, accordingly. The output voltage of the transformer circuit 2 is connected to a first P.W.M. (Pulse Width Modulator) circuit 3 and a second P.W.M. circuit 5, as a feedback. The power from the primary and secondary power sources is converted into the desired output voltages through the switching currents in the transformer circuit 2.

As stated above, the first P.W.M. circuit 3 is connected to the output of the transformer circuit 2. The first P.W.M. circuit 3 generates a pulse signal which is connected to the first switching circuit 4 and which controls the ON-OFF operation of the first switching circuit 4, which in turn controls the current passing through the transformer circuit 2 from the primary power source. Another output from the first P.W.M. circuit 3 is connected to the monitor circuit 7 so that the monitor circuit 7 can monitor the working condition of the switching circuits of the primary power source.

The second P.W.M. circuit 5 is also connected to the output of the transformer circuit 2 and to an output of the monitor circuit 7. The second P.W.M. circuit generates a pulse signal which is connected to the second switching circuit 6 and which controls the ON-OFF operation of the switching circuit 6, which in turn controls the current passing through the transformer circuit 2 from the secondary power source. The output from the monitor circuit 7 will control the P.W.M. circuit 5 and enable the circuit to work when the monitor circuit 7 detects an interruption, such as when the primary power source is low, absent, or cannot supply enough power for the load.

As mentioned above, the first switching circuit 4 is connected to the output of the P.W.M. circuit 3 and to the first input circuit of the transformer circuit 2. The first switching circuit 4 operates as an ON-OFF switch and is controlled by the input pulses from the first P.W.M. circuit 3. The first switching circuit 4 controls the transformer's switching current sourced by the primary power source.

As mentioned above, the second switching circuit 6 is connected to the output of the second P.W.M. circuit 5 and to the second input circuit of the transformer circuit 2. The second switching circuit 6 operates as an ON-OFF switch and is controlled by the input pulses from the second P.W.M. circuit 5. The second switching circuit 6 controls the transformer's switching current sourced by the secondary power source.

As mentioned above, the monitor circuit 7 is connected to one of the outputs of the P.W.M. circuit 3. The monitor circuit 7 is also connected to the output of the rectifier circuit 1, and the monitor circuit provides an output to the second P.W.M. circuit 5 in order to control the operation of the second P.W.M. circuit 5, which in turn controls the secondary power source. When the output voltage of the rectifier circuit 1 is low or when the output signal of the first P.W.M. circuit 3 shows an overloaded condition, the monitor circuit 7 will turn on the operation of the second P.W.M. circuit 5 and enable the switching power system to use the second power source for operation.

Figure 3:
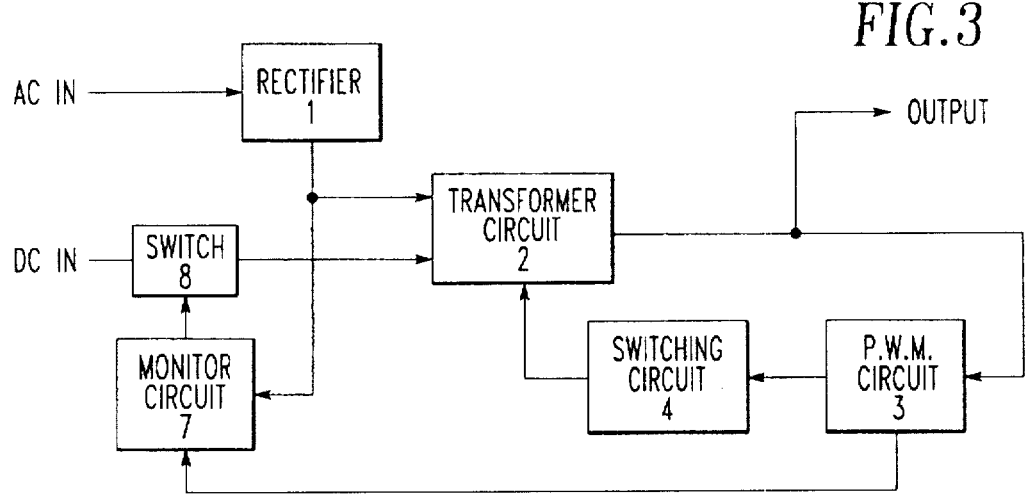
FIG. 3 shows a block diagram of an alternative embodiment of the switching power supply system according to the invention.
Figure 5:
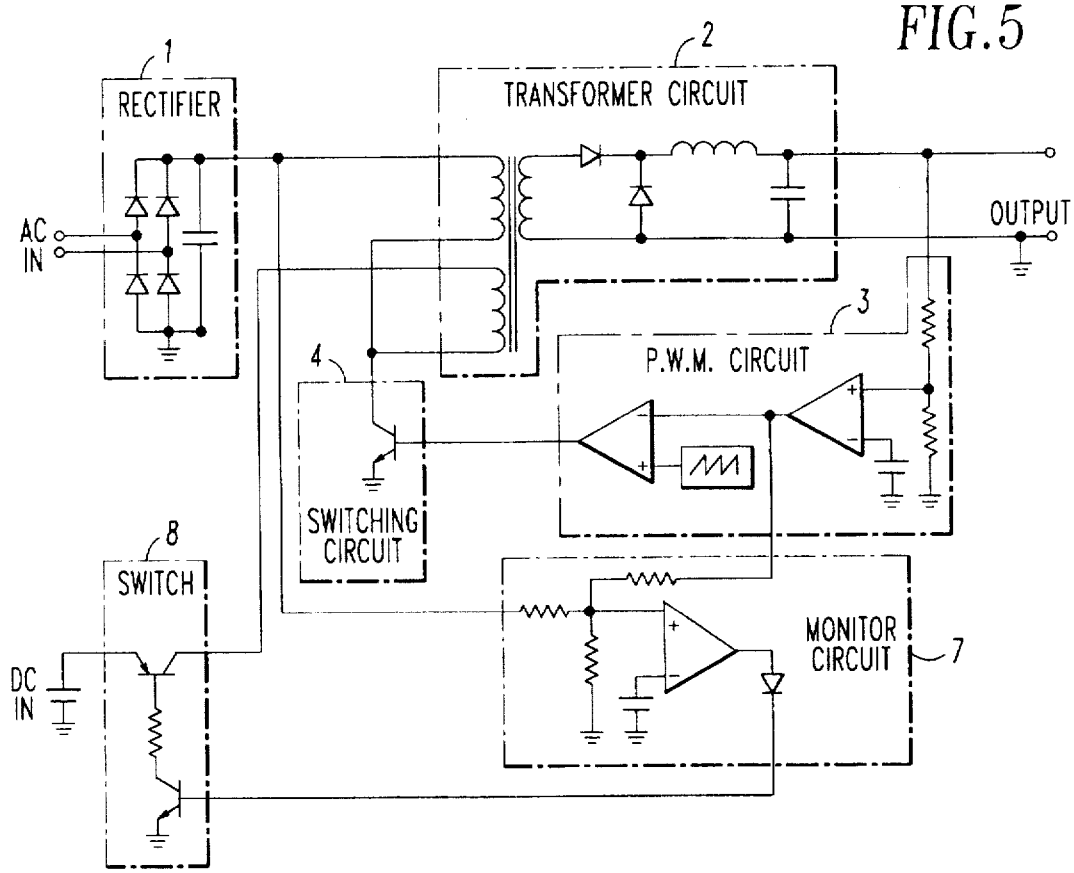
FIG. 5 shows a sample circuit of the improves switching power supply according to the block diagram of FIG. 3.
Figure 6:
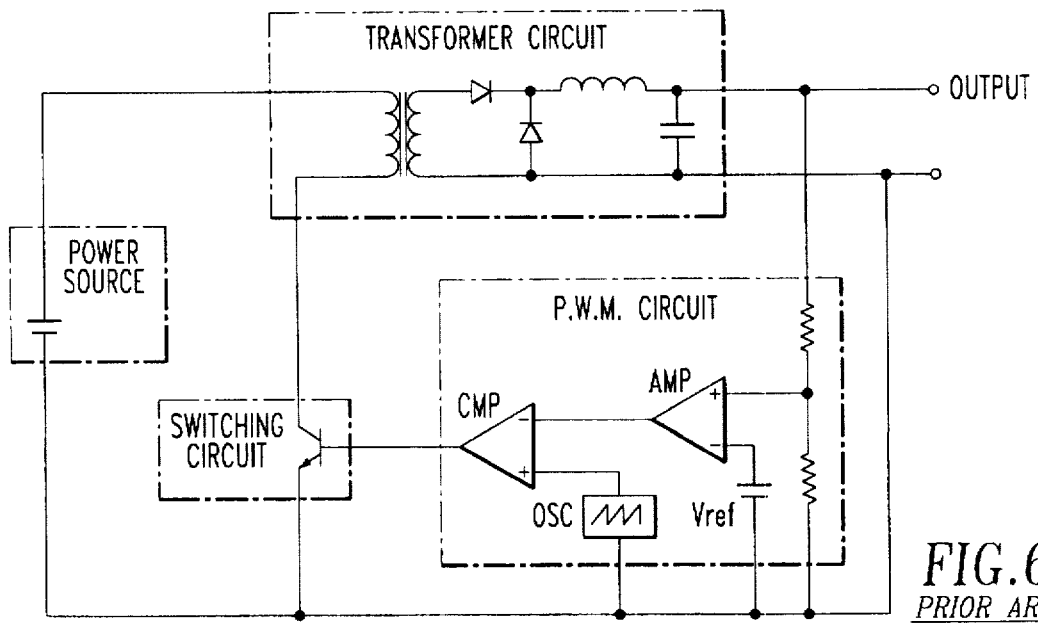
FIG. 6 shows a sample circuit of the conventional switching power supply.

A second preferred embodiment of the present invention is shown in FIGS. 3 and 5.

This embodiment comprises a rectifier circuit 1, a transformer circuit 2, a P.W.M. circuit 3, a switching circuit 4 and a monitor circuit 7, each of which are the same as the circuits of FIGS. 2 and 4. The secondary power source of this embodiment, however, is designed to share the same switching control circuits as the primary power source. As a result, the second P.W.M. circuit 5 and the second switching circuit 6 shown in FIGS. 2 and 4 are eliminated in FIGS. 3 and 5. The supply current of the secondary power source in FIGS. 3 and 5 is controlled by an additional switch 8 which is connected to and controlled by the output of the monitor circuit 7. When the monitor circuit 7 determines that the secondary power source is needed, the switch 8 is closed and the secondary power source flows into the second input circuit of the transformer circuit 2. Both the first and second input circuits of the transformer circuit 2 are connected to and are controlled by the switching circuit 4 and the P.W.M. circuit 3 in the manner described above with respect to the first preferred embodiment.

In summary, the switching power supply system of the invention is directly connected to two or more power sources of different voltage levels. Therefore, the backup battery can be directly connected to the switching power supply, the DC to AC conversion circuit of the conventional UPS system is no longer needed, and the efficiency lost during the DC to AC conversion in the prior art systems is eliminated. As a result, the backup power's supply will last longer than in prior art supplies. Without the DC to AC conversion the backup response time is shorter than a conventional UPS system. Since the invention has two power sources, the output voltages will be much more steady, especially when a large transient current occurs at the load which exceeds the instant power supply ability of the primary power source.

Also, for example, in notebook computers with the improved switching power supply, the AC to DC adaptor can be replaced by a simple rectifier and filter circuit. As a result, the production cost and the weight of the notebook computer will be greatly reduced. In view of the above description, the switching power supply of the invention really can find its application in the field of the art.

Other combinations and variations will now be readily apparent to one of ordinary skill in the art.

Although the invention has been described in detail in the foregoing for the purpose of illustration, it is to be understood that such detail is solely for that purpose, and that variations can be made therein by those of ordinary skill in the art without departing from the spirit and scope of the invention as defined by the following claims. All such variations are specifically intended to be embraced within the scope of the following claims, including all equivalents thereof.

I claim:

1. A switching power supply system comprising:
   a rectifier circuit which rectifies a primary AC power source into a DC voltage; said rectifier circuit being connected to a transformer circuit;
   a secondary power source;
   the transformer circuit has a first and a second power source input, the first power source input is connected to the primary power source through the rectifier circuit and the second power source input is connected to the secondary power source; a first and second control input is connected to a first and second switching circuit, respectively, which control switching currents from the primary and secondary power sources to the transformer circuit; an output of the transformer circuit is connected to a load and to a first and second pulse width modulator circuit as feedback control;
   the first pulse width modulator circuit is connected to the transformer circuit and a first output of the first pulse width modulator circuit is connected to the first control input of the first switching circuit and a second output is connected to a monitor circuit, the output from the transformer circuit is used as a feedback control signal and an output pulse from the first output of the first pulse width modulator circuit controls the first switching circuit's ON-OFF operation; the second output of the first pulse width modulator circuit provides the monitor circuit a monitoring signal of the operation condition of the first switching circuit sourced by the primary power source;
   the second pulse width modulator circuit is connected to the transformer circuit and the monitor circuit and an output of the second pulse width modulator circuit is connected to the second control input of the second switching circuit, the output voltage from the transformer circuit is used as a feedback control signal and an output pulse from the second pulse width modulator circuit controls the second switching circuit's ON-OFF operation; an output from the monitor circuit controls the second pulse width modulator circuit according to the supply condition of the primary power source;
   the first switching circuit is connected to the first pulse width modulator circuit mentioned above and the transformer circuit; the first switching circuit's ON-OFF operation is controlled by the first pulse width modulator circuit and will control the switching current in the transformer circuit sourced by the primary power source;
   the second switching circuit is connected to the second pulse width modulator circuit mentioned above and the transformer circuit; the second switching circuit's ON-OFF operation is controlled by the second pulse width modulator circuit and will control the switching current in the transformer circuit sourced by the secondary power source;
   the monitor circuit is connected to the rectifier circuit and the first pulse width modulator circuit, and the output from the monitor circuit is connected to the second pulse width modulator circuit; voltages from the rectifier circuit and the first pulse width modulator circuit will be monitored in the monitor circuit and if a power failure is detected, the monitor circuit will enable the second switching circuit to bring the second power source on line.

2. A switching power supply system comprising:
   a rectifier circuit which rectifies a primary AC power source into a DC voltage and is connected to a transformer circuit;
   a secondary power source;
   the transformer circuit has a first and a second power input, the first power input is connected to the primary power source through the rectifier circuit, and the second power input is connected to the secondary power source through a current switch; a control input is connected to a switching circuit; the switching circuit controls the switching currents from the primary and secondary power sources to the transformer circuit; an output of the transformer circuit is connected to a load and to a pulse width modulator circuit as a feedback control;
   the pulse width modulator circuit, is also connected to both the control input of the switching circuit and a monitor circuit; the output from the transformer circuit is used as a feedback control signal and an output pulse from the pulse width modulator circuit to the control input of the switching circuit controls the ON-OFF operation of the switching circuit; an output to the monitor circuit provides a signal of the operating condition of the switching circuit;
   the switching circuit is connected to the pulse width modulator circuit and the transformer circuit; the switching circuit's ON-OFF operation is controlled by the pulse width modulator circuit and the output from the pulse width modulator circuit controls the switching currents in the transformer circuit;

the monitor circuit is connected to the rectifier circuit and the pulse width modulator circuit, and an output is connected to the current switch for the secondary power source; voltage signals from the rectifier and the pulse width modulator circuit will be monitored in the monitor circuit and if a low power situation is detected, the monitor circuit will turn on the current switch to bring the secondary power supply on line.

3. A switching power supply system comprising:

(a) a transformer circuit, said transformer circuit comprising a first input for connection to a primary power source and second input for connection to a secondary power source;

(b) a power supply output to be connected to a load;

(c) means for regulating said power supply output;

(d) means for sensing an interruption wherein said interruption is selected from the group comprising: said primary power source falling below a first predetermined voltage, said power supply output falling below a second predetermined voltage, and said primary power source approaching an overload condition; and (e) means for utilizing said secondary power source when said interruption is sensed and, wherein said means for regulating said power supply output, said means for sensing an interruption, and said means for utilizing said secondary power source when said interruption is sensed comprises:

(i) a first switching circuit controlling a current flow from said primary power source through said first input of said transformer circuit;

(ii) a first pulse width modulator circuit regulating said power supply output by controlling the on and off operation of said first switching circuit;

(iii) a second switching circuit controlling a current flow from said secondary power source through said second input of said transformer circuit;

(iv) a second pulse width modulator circuit regulating said power supply output by controlling the on and off operation of said second switching circuit; and (v) a monitor circuit monitoring a voltage from said first input and monitoring a voltage from said first pulse width modulator circuit, said monitor circuit comparing both said voltage from said first input and said voltage from said first pulse width modulator circuit to a reference voltage, and said monitor circuit enabling said second pulse width modulator circuit when said voltage from said first input and said voltage from said first pulse width modulator circuit are below said reference voltage.

4. A switching power supply system comprising:

(a) a transformer circuit, said transformer circuit comprising a first input for connection to a primary power source and a second input for connection to a secondary power source;

(b) a power supply output to be connected to a load;

(c) means for regulating said power supply output;

(d) means for sensing an interruption, wherein said interruption is selected from the group comprising: said primary power source falling below a first predetermined voltage, said power supply output falling below a second predetermined voltage, and said primary power source approaching an overload condition; and (e) means for utilizing said secondary power source when said interruption is sensed, and wherein said means for regulating said power supply output, said means for sensing an interruption, and said means for utilizing said secondary power source when said interruption is sensed comprises:

(i) a switching circuit controlling the current flow from both said primary and said secondary power sources through said transformer circuit;

(ii) a pulse width modulator circuit regulating said power supply output by controlling the on and off operation of said switching circuit;

(iii) a switch being located between said secondary power source and said second input of said transformer circuit, said switch being closed when an interrupt is sensed; and (iv) a monitor circuit monitoring a voltage from said first input and monitoring a voltage from said pulse width modulator circuit, said monitor circuit comparing both said voltage from said first input and said voltage from said pulse width modulator circuit to a reference voltage, and said monitor circuit closing said switch when said voltage from said first input and said voltage from said pulse width modulator circuit are below said reference voltage.

* * * * *